(12) United States Patent
Kumar et al.

(10) Patent No.: US 12,536,839 B2
(45) Date of Patent: Jan. 27, 2026

(54) UNIFIED ENROLLMENT FOR DEVICES WITH MULTIPLE FINGERPRINT SENSORS

(71) Applicant: QUALCOMM Incorporated, San Diego, CA (US)

(72) Inventors: Raj Kumar, San Diego, CA (US); Deepak Rajendra Karnik, San Diego, CA (US); Seong Jun Ma, San Diego, CA (US); Robert Opalsky, San Diego, CA (US); Sandeep Louis D'Souza, San Diego, CA (US); Kwokleung Chan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/460,517

(22) Filed: Sep. 1, 2023

(65) Prior Publication Data

US 2025/0078578 A1 Mar. 6, 2025

(51) Int. Cl.
*G06V 40/50* (2022.01)
*G06F 3/041* (2006.01)
*G06V 10/94* (2022.01)
*G06V 40/12* (2022.01)
*G06V 40/13* (2022.01)
*G06V 40/60* (2022.01)

(52) U.S. Cl.
CPC ........... *G06V 40/50* (2022.01); *G06F 3/0416* (2013.01); *G06V 10/945* (2022.01); *G06V 40/13* (2022.01); *G06V 40/1371* (2022.01); *G06V 40/67* (2022.01); *G06F 2203/04102* (2013.01)

(58) Field of Classification Search
CPC ........ G06V 40/50; G06V 40/67; G06V 40/13; G06V 40/1371; G06V 10/945; G06F 3/0416; G06F 2203/04102
See application file for complete search history.

(56) References Cited

U.S. PATENT DOCUMENTS

2016/0063294 A1* 3/2016 Du ................ G06V 40/1312
382/124
2018/0373913 A1* 12/2018 Panchawagh .......... H10K 59/65
2020/0133335 A1* 4/2020 Wu ................ H05K 1/189
(Continued)

*Primary Examiner* — Kwang-Su Yang
(74) *Attorney, Agent, or Firm* — QUALCOMM Incorporated

(57) ABSTRACT

Some disclosed methods involve performing a fingerprint enrollment process involving obtaining fingerprint image data via a first fingerprint sensor of a fingerprint sensor system including two or more fingerprint sensors and creating a first fingerprint sensor template for subsequent fingerprint authentication via the first fingerprint sensor. Some disclosed methods involve determining a second fingerprint sensor of the fingerprint sensor system for which a fingerprint template will be created, determining one or more second fingerprint sensor characteristics of the second fingerprint sensor and creating a second fingerprint sensor template for subsequent fingerprint authentication via the second fingerprint sensor based, at least in part, on the first fingerprint sensor template and the one or more second fingerprint sensor characteristics. In some examples, the method may involve creating the second fingerprint sensor template without performing an enrollment process involving the second fingerprint sensor.

28 Claims, 9 Drawing Sheets

(56) References Cited

U.S. PATENT DOCUMENTS

| | | | |
|---|---|---|---|
| 2021/0209206 A1* | 7/2021 | Li | G06V 40/12 |
| 2022/0374054 A1* | 11/2022 | Heo | G06F 1/1684 |
| 2023/0045850 A1* | 2/2023 | Sammoura | G06V 10/751 |
| 2023/0196821 A1* | 6/2023 | Kim | H05K 9/00 |
| | | | 345/156 |

* cited by examiner

Match Operation for Secondary Sensor

UNIFIED ENROLLMENT FOR DEVICES WITH MULTIPLE FINGERPRINT SENSORS

TECHNICAL FIELD

This disclosure relates generally to fingerprint sensors and relates more specifically to devices that include multiple fingerprint sensors.

DESCRIPTION OF THE RELATED TECHNOLOGY

Biometric authentication can be an important feature for controlling access to devices, etc. Many existing products include some type of biometric authentication, including but not limited to fingerprint-based authentication. Although some existing fingerprint-based authentication methods and devices can provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a fingerprint sensor system including two or more fingerprint sensors and a control system configured for communication with the fingerprint sensor system. In some implementations, a mobile device (such as a wearable device, a cellular telephone, etc.) may be, or may include, at least part of the apparatus.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured to perform a fingerprint enrollment process involving obtaining fingerprint image data via a first fingerprint sensor of the fingerprint sensor system, create a first fingerprint sensor template for subsequent fingerprint authentication via the first fingerprint sensor, determine a second fingerprint sensor of the fingerprint sensor system for which a fingerprint template will be created, determine one or more second fingerprint sensor characteristics of the second fingerprint sensor, and create a second fingerprint sensor template for subsequent fingerprint authentication via the second fingerprint sensor based, at least in part, on the first fingerprint sensor template and the one or more second fingerprint sensor characteristics.

In some examples, the control system may be configured to create the second fingerprint sensor template without performing an enrollment process involving the second fingerprint sensor. According to some examples, the one or more second fingerprint sensor characteristics may include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of the apparatus, or combinations thereof. In some examples, the second fingerprint sensor template may be based, at least in part, on a size of the second fingerprint sensor. According to some examples, creating the second fingerprint sensor template may involve fingerprint image artifact selection, resizing, cropping, or combinations thereof.

Other innovative aspects of the subject matter described in this disclosure may be implemented in a method. In some examples, the method may involve: performing a fingerprint enrollment process involving obtaining fingerprint image data via a first fingerprint sensor of a fingerprint sensor system including two or more fingerprint sensors; creating a first fingerprint sensor template for subsequent fingerprint authentication via the first fingerprint sensor; determining a second fingerprint sensor of the fingerprint sensor system for which a fingerprint template will be created; determining one or more second fingerprint sensor characteristics of the second fingerprint sensor; and creating a second fingerprint sensor template for subsequent fingerprint authentication via the second fingerprint sensor based, at least in part, on the first fingerprint sensor template and the one or more second fingerprint sensor characteristics.

In some examples, the method may involve creating the second fingerprint sensor template without performing an enrollment process involving the second fingerprint sensor. According to some examples, the one or more second fingerprint sensor characteristics may include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of the apparatus, or combinations thereof. In some examples, the second fingerprint sensor template may be based, at least in part, on a size of the second fingerprint sensor. According to some examples, creating the second fingerprint sensor template may involve fingerprint image artifact selection, resizing, cropping, or combinations thereof.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
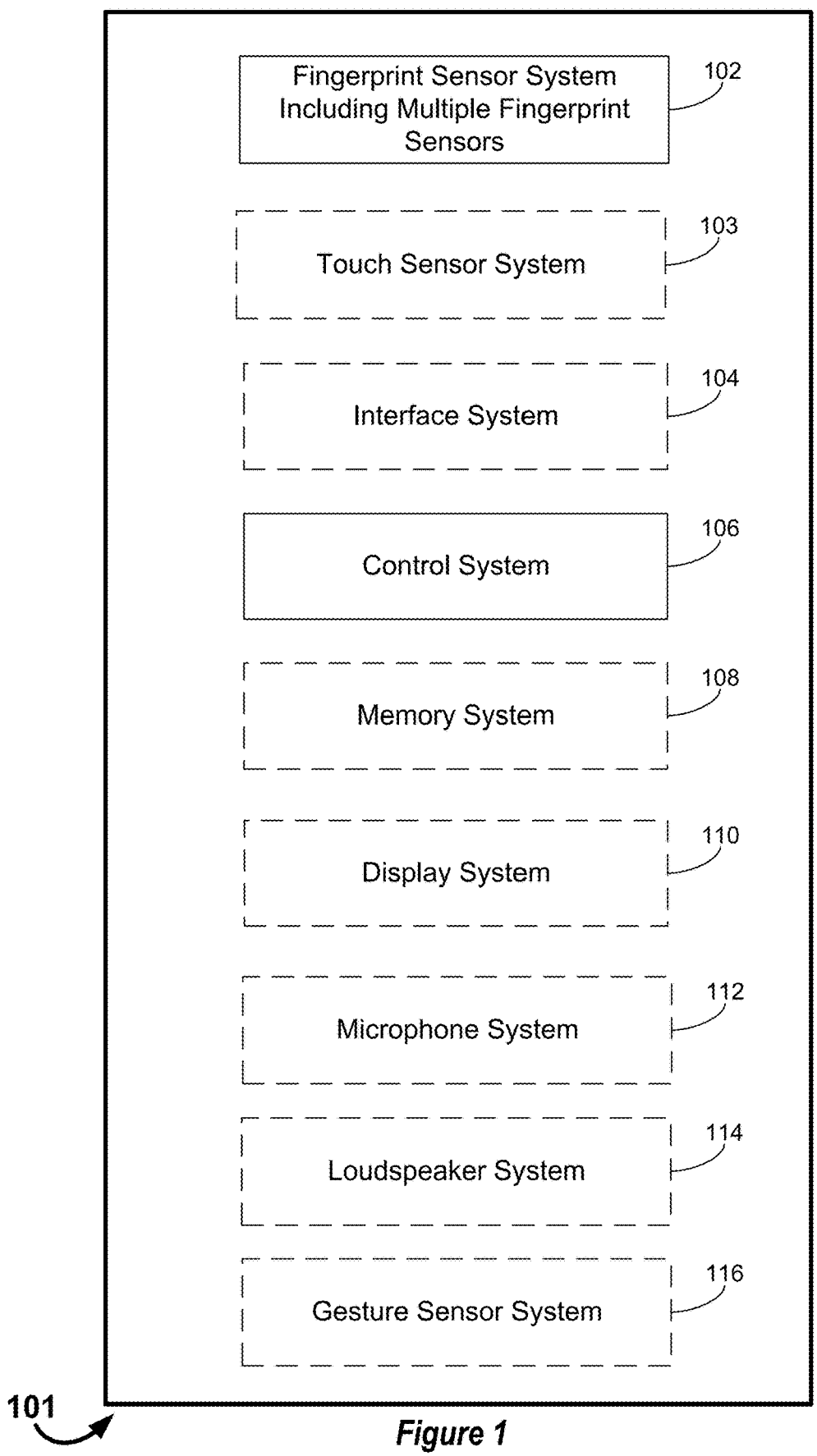
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many devices, including but not limited to mobile devices, are configured to implement fingerprint-based authentication. Some devices, including but not limited to mobile foldable devices, may include more than one fingerprint sensor. In some instances, the fingerprint sensors may have different sizes, different capabilities, or both. In currently-deployed implementations, each sensor of a different size requires a separate enrollment process. Requiring multiple enrollment processes is a sub-par user experience.

Some disclosed methods involve performing a fingerprint enrollment process involving obtaining fingerprint image data via a first fingerprint sensor of a fingerprint sensor system including two or more fingerprint sensors and creating a first fingerprint sensor template for subsequent fingerprint authentication via the first fingerprint sensor. Some such methods involve creating a second fingerprint sensor template for subsequent fingerprint authentication via a second fingerprint sensor based, at least in part, on the first fingerprint sensor template and one or more second fingerprint sensor characteristics. In some such examples, the method may involve creating the second fingerprint sensor template without performing an enrollment process involving the second fingerprint sensor.

Particular implementations of the subject matter described in this disclosure may be implemented to realize one or more of the following potential advantages. Some disclosed unified enrollment implementations allow a user to go through only one enrollment process with a first fingerprint sensor of a device that includes multiple fingerprint sensors. In some examples, the first fingerprint sensor may be the largest fingerprint sensor of the device, which can potentially provide a faster and more efficient enrollment process than enrollment processes involving relatively smaller fingerprint sensors. Some device implementations are capable of creating a second fingerprint sensor template from a first fingerprint sensor template and one or more second fingerprint sensor characteristics without requiring a user to participate in an enrollment process involving the second fingerprint sensor. Such implementations have the potential advantages of an improved user experience, greater efficiency and a reduced level of power consumption.

FIG. 1 is a block diagram that shows example components of an apparatus according to some disclosed implementations. In this example, the apparatus 101 includes a fingerprint sensor system 102 and a control system 106. According to this example, the fingerprint sensor system 102 includes multiple (two or more) fingerprint sensors. Some implementations may include a touch sensor system 103, an interface system 104, a memory system 108, a display system 110, a microphone system 112, a loudspeaker system 114, a gesture sensor system 116, or combinations thereof.

According to some examples, the fingerprint sensor system 102 may be, or may include, one or more ultrasonic fingerprint sensors. Alternatively, or additionally, in some implementations the fingerprint sensor system 102 may be, or may include, one or more other types of fingerprint sensor, such as one or more optical fingerprint sensors, one or more capacitive fingerprint sensors, one or more thermal fingerprint sensors, etc. In some examples, an ultrasonic fingerprint sensor may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the display system 110, the microphone system 112, the loudspeaker system 114, the gesture sensor system 116, or combinations thereof may be considered to be components of the interface system 104, even though these components are shown as separate blocks in FIG. 1. In some examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. In implementations wherein the apparatus includes a touch sensor system 103, the control system 106 may be configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a display system 110, the control system 106 may be configured for communication with, and for controlling, the display system 110. In implementations wherein the apparatus includes a microphone system 112, the control system 106 may be configured for communication with, and for controlling, the microphone system 112. In implementations wherein the apparatus includes an loudspeaker system 114, the control system 106 may be configured for communication with, and for controlling, the loudspeaker system 114. According to some examples, the control system 106 may include one or more dedicated components that are configured for controlling the fingerprint sensor system 102, the touch sensor system 103, the memory system 108, the display system 110, the microphone system 112 and/or the loudspeaker system 114.

Accordingly, some examples of the apparatus 101 may include dedicated components that are configured for controlling at least a portion of the fingerprint sensor system 102, for processing fingerprint image data received from the fingerprint sensor system 102, or combinations thereof. Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones, one or more types of microphones, or combinations thereof.

According to some implementations, the apparatus 101 may include an loudspeaker system 114. The loudspeaker system 114 may include one or more loudspeakers, one or more types of loudspeakers, or combinations thereof.

In some implementations, the apparatus 101 may include a gesture sensor system 116. The gesture sensor system 116 may be, or may include, an ultrasonic gesture sensor system, an optical gesture sensor system or any other suitable type of gesture sensor system.

According to some implementations, the control system 106 may be configured to perform a fingerprint enrollment process involving obtaining fingerprint image data via a first fingerprint sensor of the fingerprint sensor system 102. In some implementations, the control system 106 may be configured to create a first fingerprint sensor template for subsequent fingerprint authentication via the first fingerprint sensor.

In some implementations, the control system 106 may be configured to determine a second fingerprint sensor of the fingerprint sensor system 102 for which a fingerprint template will be created based, at least in part, on the first fingerprint sensor template. In some examples, the determination may be based, at least in part, on user input. For example, the determination may be based, at least in part, on user input received via a graphical user interface (GUI) that provides a user with various enrollment options. The user may, for example, have selected an option involving unifying the enrollment of the second fingerprint sensor with that of the first fingerprint sensor.

According to some implementations, the control system 106 may be configured to determine one or more second fingerprint sensor characteristics of the second fingerprint sensor and to create a second fingerprint sensor template for subsequent fingerprint authentication via the second fingerprint sensor based, at least in part, on the first fingerprint sensor template and the one or more second fingerprint sensor characteristics. The one or more second fingerprint sensor characteristics may, for example, include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of the apparatus, or combinations thereof. In some examples, the control system 106 may be configured to create the second fingerprint sensor template without performing an enrollment process involving the second fingerprint sensor.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, a watch, an armband, a wristband, a ring, a headband, an earbud or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2A:
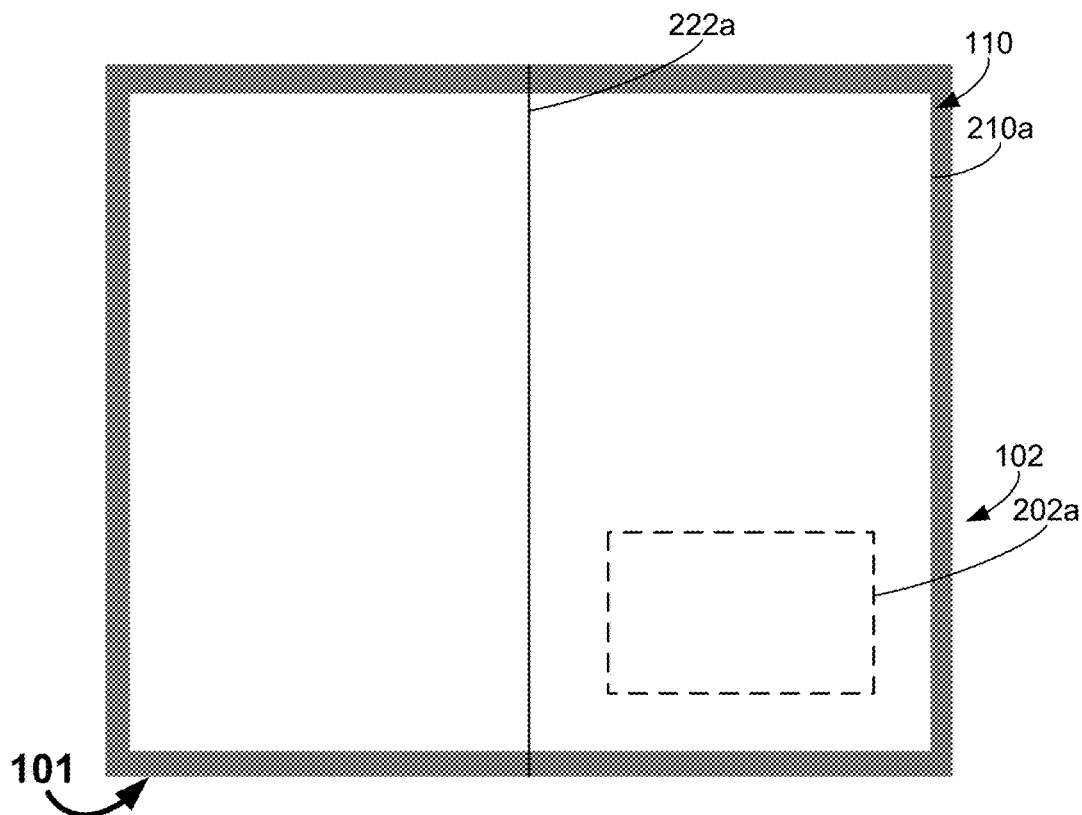
FIGS. 2A, 2B and 2C show examples of devices in which aspects of the present disclosure may be implemented.
Figure 2B:
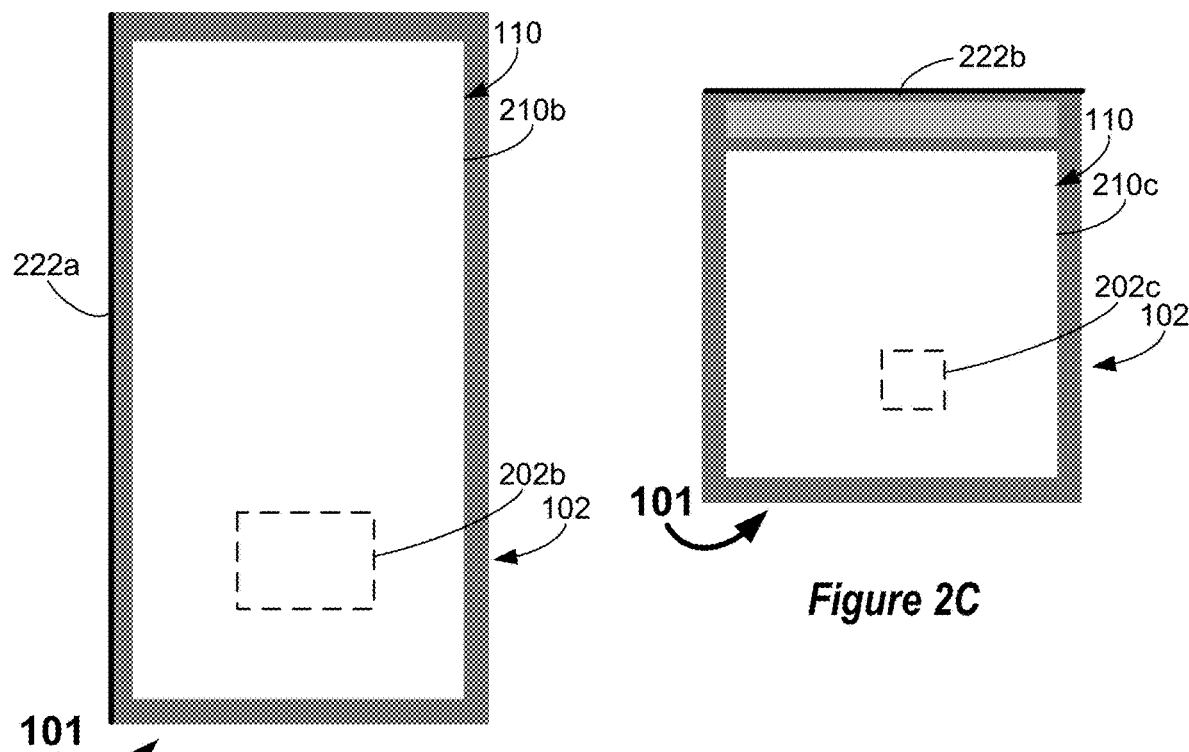
Figure 2C:
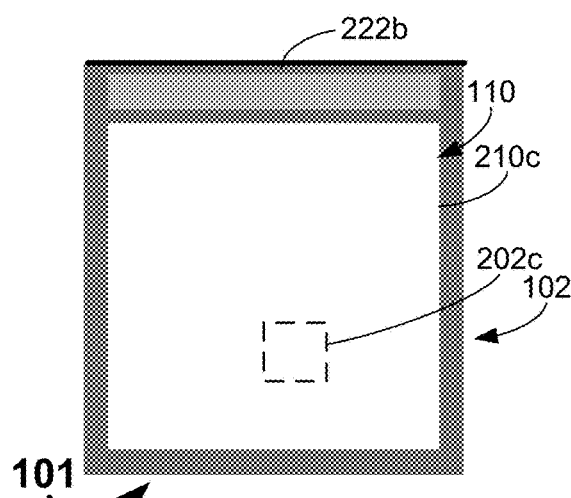

FIGS. 2A, 2B and 2C show examples of devices in which aspects of the present disclosure may be implemented. As with other disclosed examples, the types, numbers, sizes and arrangements of elements shown in FIGS. 2A, 2B and 2C and described herein are merely examples. Other examples may include more, fewer or different elements.

According to these examples, the apparatus 101 is a foldable device that includes a fingerprint sensor system 102, a control system 106 (not shown) and a display system 110 that includes two or more displays. In these examples, the fingerprint sensor system 102 includes multiple fingerprint sensors. According to these examples, the fingerprint sensors reside below a display. In other words, in these examples a display resides between each of the fingerprint sensors and an outer surface of the apparatus 101—such as a display glass, a protective layer, etc.—upon which a user may place a digit to be scanned by the fingerprint sensors.

In the example shown in FIG. 2A, the fingerprint sensor system 102 includes the fingerprint sensor 202a and at least one other fingerprint sensor that is not visible in FIG. 2A. According to the example shown in FIG. 2A, the apparatus 101 is foldable along the hinge 222a. In FIG. 2A, the apparatus 101 is shown in an "open" configuration in which the fingerprint sensor 202a is accessible. The outline of the fingerprint sensor 202a is shown in a dashed line because the display 210a resides between the fingerprint sensor 202a and an outer surface of the apparatus 101. In this example, the fingerprint sensor 202a is a primary fingerprint sensor, which also may be referred to herein as a "first fingerprint sensor."

In some examples, the fingerprint sensor 202a may be the largest fingerprint sensor of the apparatus 101, which can potentially provide a faster and more efficient enrollment process than enrollment processes involving the other, relatively smaller fingerprint sensors of the apparatus 101. In some examples, the fingerprint sensor 202a may be the largest of three or more fingerprint sensors, or the larger of two fingerprint sensors.

According to this example, the control system 106 is configured to perform a fingerprint enrollment process involving obtaining fingerprint image data via the fingerprint sensor 202a. In this example, the control system 106 is configured to create a first fingerprint sensor template, based on the fingerprint image data obtained via the fingerprint sensor 202a, for subsequent fingerprint authentication via the fingerprint sensor 202a. The first fingerprint sensor template also may be referred to herein as a primary fingerprint sensor template, because the enrollment process takes place on the primary sensor. The primary fingerprint sensor template may, for example, include fingerprint minutiae data corresponding to fingerprint minutiae extracted from the fingerprint image data. The primary fingerprint sensor template also may include fingerprint minutiae location data corresponding to locations of the fingerprint minutiae. The primary fingerprint sensor template may be used for subsequent fingerprint authentication via the fingerprint sensor 202a. Moreover, the control system 106 may be configured to create one or more additional fingerprint sensor templates that are based, at least in part, on the primary fingerprint sensor template.

In the example shown in FIG. 2B, the fingerprint sensor system 102 includes the fingerprint sensor 202b and at least one other fingerprint sensor that is not visible in FIG. 2B. According to this example, FIG. 2B shows the apparatus 101 of FIG. 2A after the apparatus 101 has been folded along the hinge 222a. In FIG. 2B, the apparatus 101 is shown in a "closed" configuration in which the fingerprint sensor 202a is neither shown nor accessible. The outline of the fingerprint sensor 202b is shown in a dashed line because the display 210b resides between the fingerprint sensor 202b and an outer surface of the apparatus 101. In this example, the fingerprint sensor 202b is a secondary fingerprint sensor and is smaller than the fingerprint sensor 202a.

According to some examples, the control system 106 may be configured to create a secondary fingerprint sensor template based, at least in part, on the primary fingerprint sensor template. The secondary fingerprint sensor template—which also may be referred to herein as a "second fingerprint sensor template"—may be used for subsequent fingerprint authentication via the fingerprint sensor 202b. In some examples, the control system 106 may be configured to create the secondary fingerprint sensor template without performing an enrollment process involving the fingerprint sensor 202b.

In some examples, the control system 106 may be configured to create the secondary fingerprint sensor template based on the primary fingerprint sensor template and on one or more fingerprint sensor characteristics of the fingerprint sensor 202b. The one or more fingerprint sensor characteristics may, for example, include the size of the fingerprint sensor 202b. For example, if the area of the fingerprint sensor 202b is less than the contact area of a digit used for fingerprint authentication using the fingerprint sensor 202b, then the fingerprint sensor 202b will not be able to obtain fingerprint image data corresponding to the entire contact area of the digit. If the primary fingerprint sensor template includes fingerprint minutiae corresponding to the entire contact area of the digit, in some examples the secondary fingerprint sensor template may include multiple subsets of the primary fingerprint sensor template. In some examples, each subset may correspond to an area of the primary fingerprint sensor template that equals the area of the fingerprint sensor 202b. In some alternative examples, each subset may correspond to an area of the primary fingerprint sensor template that is less than or equal to the area of the fingerprint sensor 202b. In some examples, each of the subsets may include fingerprint minutiae that could have been obtained during an enrollment process that involved obtaining fingerprint image data from a fingerprint sensor that is the same size as the fingerprint sensor 202b. Accordingly, each of the subsets could include a collection of fingerprint minutiae that could be obtained during an authentication process that involves obtaining fingerprint image data from the fingerprint sensor 202b.

Figure 2D:
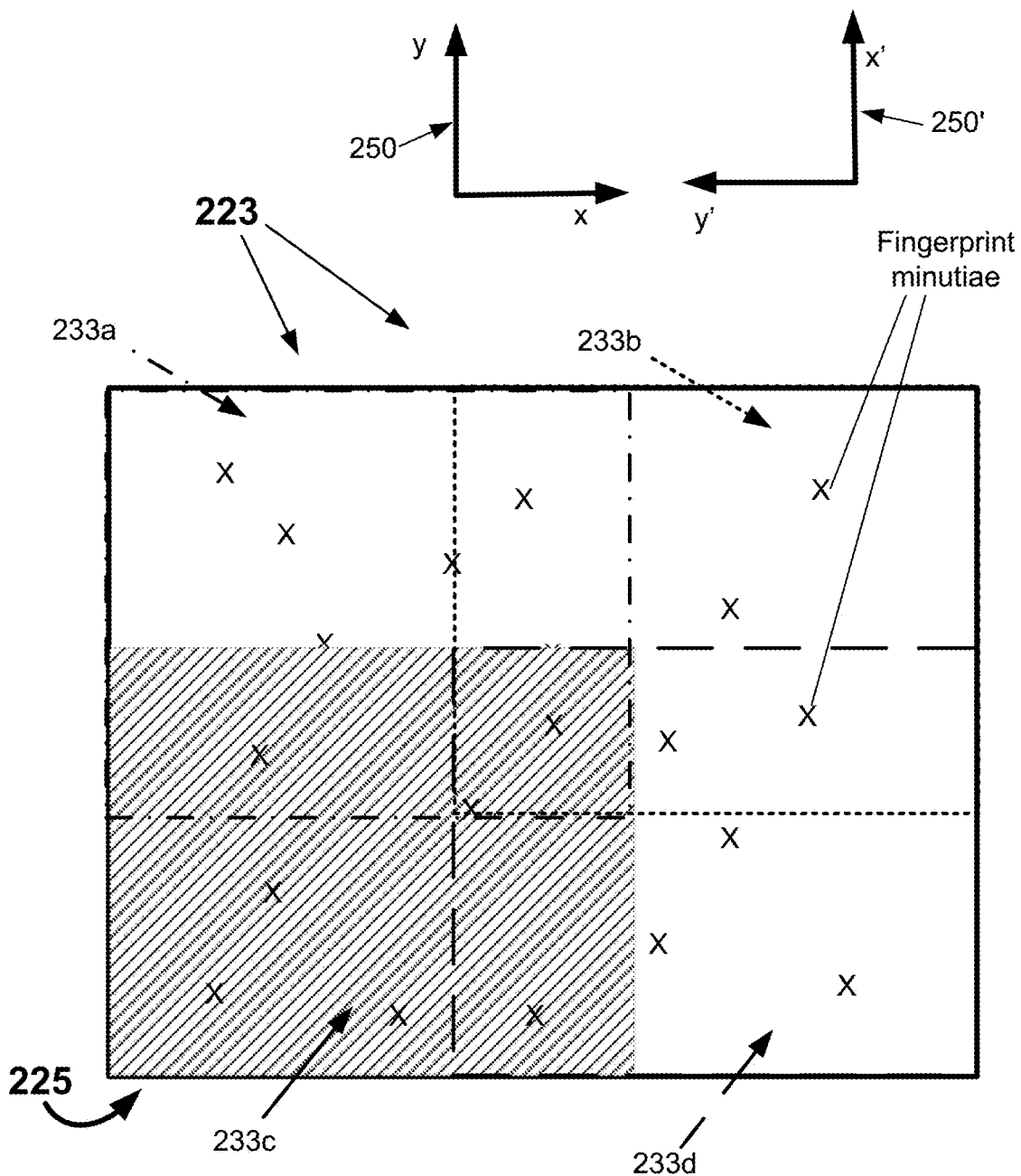
FIG. 2D shows an example of creating a secondary fingerprint sensor template based on a primary fingerprint sensor template that was obtained via a relatively larger primary fingerprint sensor.

FIG. 2D shows an example of creating a secondary fingerprint sensor template based on a primary fingerprint sensor template that was obtained via a relatively larger primary fingerprint sensor. In this example, fingerprint minutiae are represented by a capital letter "X." Element 225 of FIG. 2D is a visual representation of the primary fingerprint sensor template. According to this example, the primary fingerprint sensor template was obtained by extracting fingerprint minutiae from fingerprint image data obtained by the fingerprint sensor 202a of FIG. 2A. In this example, the area of the primary fingerprint sensor template representation 225 corresponds with the area of the fingerprint sensor 202a. The primary fingerprint sensor template also includes fingerprint minutiae location data corresponding to locations of the fingerprint minutiae: here, the fingerprint minutiae location data has been used to present each of the fingerprint minutiae in its corresponding location within the primary fingerprint sensor template representation 225.

In this example, the secondary fingerprint sensor template 223 includes subsets 233a, 233b, 233c and 233d of the primary fingerprint sensor template representation 225. In FIG. 2D, the boundary of each of the subsets 233a-233d is represented by a different type of line, in order to allow these boundaries to be more readily distinguishable. In this example, the area of the subset 233c includes a diagonal line fill. According to the example shown in FIG. 2D, each of the subsets 233a-233d corresponds to a portion of the primary fingerprint sensor template that equals the area of the fingerprint sensor 202b. Other examples may involve creating more subsets, fewer subsets, different subsets, or combinations thereof, from the primary fingerprint sensor template representation 225. In some alternative examples, each subset may correspond to an area of the primary fingerprint sensor template representation 225 that is less than or equal to the area of the fingerprint sensor 202b. In some examples, when the fingerprint sensor 202b is used during a fingerprint authentication process, one or more—and sometimes all—of the subsets 233a-233d of the secondary fingerprint sensor template 223 may be used to determine whether there is a match with currently-obtained fingerprint sensor data.

According to some examples, the one or more fingerprint sensor characteristics used by the control system 106 to create the secondary fingerprint sensor template from the primary fingerprint sensor template may include the orientation of the fingerprint sensor 202a, the orientation of the fingerprint sensor 202b, or both. In one example, the orientation of the fingerprint sensor 202a may be orthogonal to the orientation of the fingerprint sensor 202b. The coordinate system 250 in FIG. 2D may, for example, correspond with the orientation of the fingerprint sensor 202a and the coordinate system 250' may correspond with the orientation of the fingerprint sensor 202b. If the orientation of the fingerprint sensor 202a is orthogonal to the orientation of the fingerprint sensor 202b, the control system 106 may be configured to create the secondary fingerprint sensor template by applying a transform to the areas of each of the subsets 233a-233d such that the fingerprint minutiae locations of the primary fingerprint sensor template are properly indicated for the relative orientations of the fingerprint sensors 202a and 202b.

However, even if the orientation of the fingerprint sensor 202a is different from the orientation of the fingerprint sensor 202b, such a transformation may not be necessary if a user is prompted to use the fingerprint sensor 202b for authentication at the appropriate orientation. For example, if the orientation of the fingerprint sensor 202a is orthogonal to the orientation of the fingerprint sensor 202b, the control system 106 may be configured to control the display 210b to present a graphical user interface (GUI) that prompts the user to place a digit on the surface of the apparatus proximate the fingerprint sensor 202b at an orientation that is orthogonal to the orientation of the fingerprint sensor 202a, for example as indicated by the coordinate system 250'.

According to some examples, the one or more fingerprint sensor characteristics used by the control system 106 to create the secondary fingerprint sensor template from the primary fingerprint sensor template may include a type of the fingerprint sensor 202b, a resolution of the fingerprint sensor 202b, information regarding material residing between the fingerprint sensor 202b and an outer surface of the apparatus, or combinations thereof. All of these factors may affect the number and quality of fingerprint minutiae that could reliably be obtained during an authentication process using the fingerprint sensor 202b.

For example, if the fingerprint sensor 202b has a relatively lower resolution than that of the fingerprint sensor 202a, relatively smaller fingerprint minutiae, relatively fainter fingerprint minutiae, etc., may not be reliably detectable by the fingerprint sensor 202b during an authentication process. Similarly, material residing between the fingerprint sensor 202b and an outer surface of the apparatus may make relatively smaller fingerprint minutiae, relatively fainter fingerprint minutiae, etc., either more likely or less likely to be detected by the fingerprint sensor 202b during an authentication process. For example, if the display 210b shown in FIG. 2B is near an outside surface of the apparatus 101, there may be a relatively thicker protective layer, or relatively thicker protective layers, on the display 210b than on the display 210a. The relatively thicker protective layer(s) on the display 210b also may be exposed to relatively more damage than those on the display 210a, because the display 210b is near an outside surface. Both of these factors may degrade the ability of the fingerprint sensor 202b to reliably detect relatively smaller fingerprint minutiae, relatively fainter fingerprint minutiae, etc.

In some examples, fingerprint minutiae that were extracted from fingerprint image data obtained during an enrollment process using the fingerprint sensor 202a may be ranked according to their detectability. For example, relatively smaller fingerprint minutiae, relatively fainter fingerprint minutiae, etc., may be assigned a relatively lower detectability rank. In some examples, fingerprint minutiae that have a detectability rank that is below a detectability threshold may not be included in the secondary fingerprint sensor template that will be used for fingerprint authentication via the fingerprint sensor 202b. Alternatively, or additionally, fingerprint minutiae that have a detectability rank that is below a detectability threshold may be assigned relatively less weight, or importance, during a fingerprint authentication process using the fingerprint sensor 202b than fingerprint minutiae that have a detectability rank that is above the detectability threshold.

In the example shown in FIG. 2C, the fingerprint sensor system 102 includes the fingerprint sensor 202c and at least one other fingerprint sensor that is not visible in FIG. 2C. According to this example, FIG. 2C shows the apparatus 101 after the apparatus 101 has been folded along the hinge 222b. In FIG. 2C, the apparatus 101 is shown in a "closed" configuration in which a primary fingerprint sensor is neither shown nor accessible. The outline of the fingerprint sensor 202c is shown in a dashed line because the display 210c resides between the fingerprint sensor 202c and an outer surface of the apparatus 101. In this example, the fingerprint sensor 202c is a secondary fingerprint sensor and is smaller than the primary fingerprint sensor. According to this example, when the apparatus 101 is open, a primary fingerprint sensor is available for use.

According to some examples, the control system 106 (not shown) may be configured to create a secondary fingerprint sensor template based, at least in part, on a primary fingerprint sensor template obtained during an enrollment process involving the primary fingerprint sensor. The secondary fingerprint sensor template may be used for subsequent fingerprint authentication via the fingerprint sensor 202c. In some examples, the control system 106 may be configured to create the secondary fingerprint sensor template without performing an enrollment process involving the fingerprint sensor 202c, for example as described above with reference to FIG. 2B.

Figure 3:
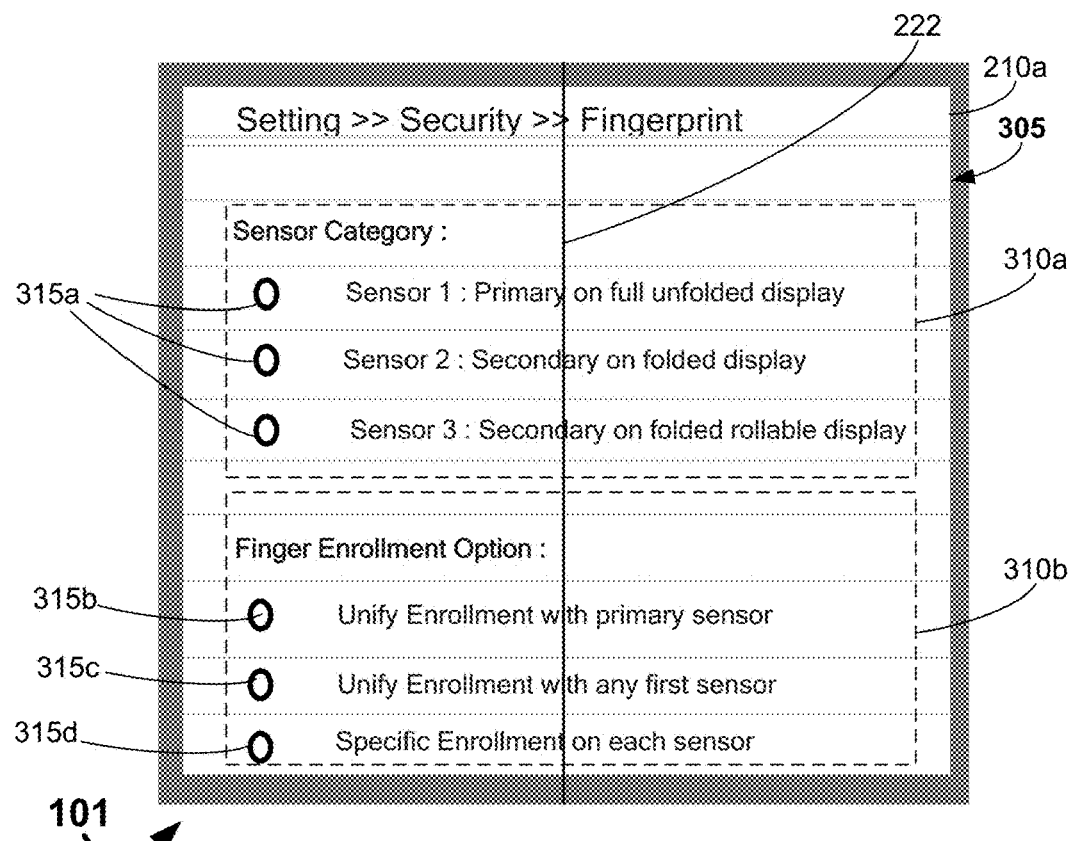
FIGS. 3 and 4 show examples of graphical user interfaces (GUIs) that may be presented in accordance with some aspects of this disclosure.
Figure 4:
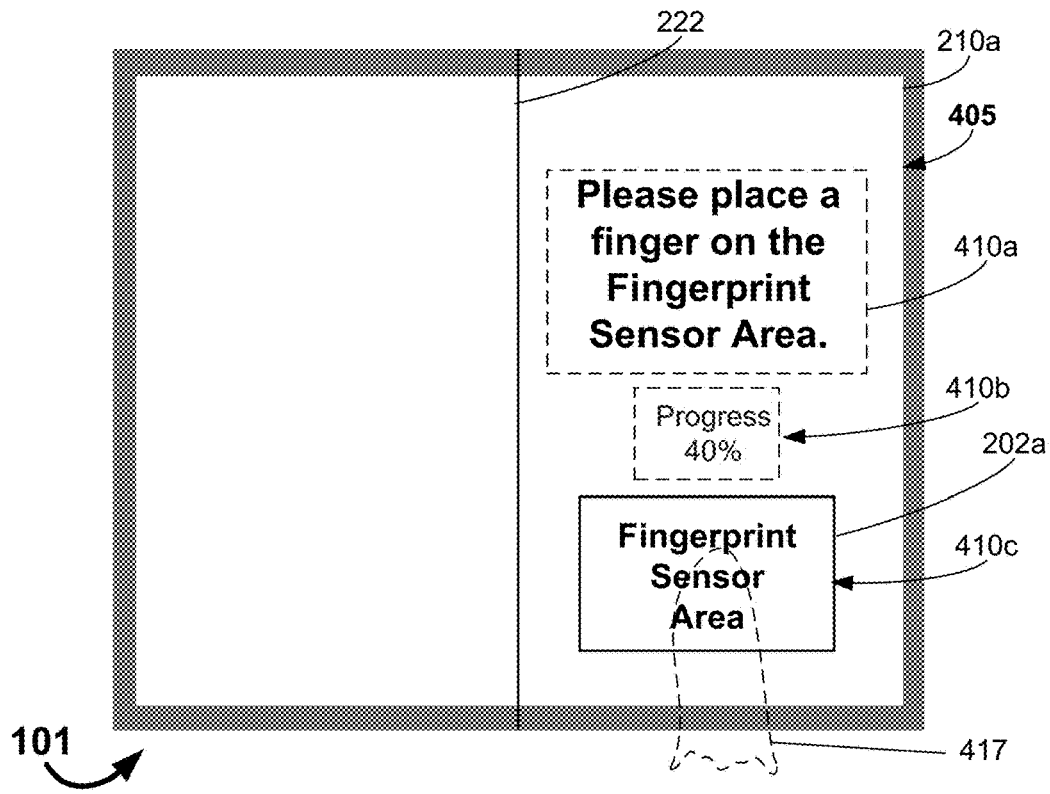

FIGS. 3 and 4 show examples of graphical user interfaces (GUIs) that may be presented in accordance with some aspects of this disclosure. In the examples shown in FIGS. 3 and 4, the control system 106 is configured to control the display 210a of FIG. 2A to present the graphical user interfaces (GUIs) 305 and 405, respectively. Other GUIs contemplated by the present inventors may be similar to the GUIs 305 and 405, but may have more, fewer or different elements.

In the example shown in FIG. 3, the GUI 305 presents options for a fingerprint enrollment process. According to this example, the GUI area 310a presents options for identification of primary and secondary fingerprint sensors. By touching selected ones of the areas 315a, a user may select primary and secondary sensor types. In this example, the default is for the primary sensor to be the sensor 202a, which is accessible when the apparatus 101 is in an unfolded configuration. In some examples, a secondary sensor may be on the outside of a folded display, as shown in FIGS. 2B and 2C. Alternatively, or additionally, a secondary sensor may be on the outside of a folded rollable display. In some examples, the GUI 305—or a similar GUI—may present different options for primary sensor selection. For example, the GUI 305—or a similar GUI—may present the user with an option for making the sensor 202b the primary sensor. This may be desirable, or at least workable, if the sensor 202b is larger than the sensor 202a, or is not significantly smaller than the sensor 202a.

According to this example, the GUI area 310b presents fingerprint enrollment options for identification of primary and secondary fingerprint sensors. By touching one of the areas 315b, 315c or 315d, a user may select whether to unify enrollment with the primary sensor, to unify enrollment with whatever sensor is first used for an enrollment process, or to have a separate enrollment process for each sensor, respectively. As used herein, "unify enrollment" means to enable a unified enrollment process such as one of those disclosed herein, in which a template for one or more other sensors is made from the template of a first or primary sensor, without the need for one or more separate enrollment processes involving the other sensor(s).

In the example shown in FIG. 4, the GUI 405 provides user prompts for a fingerprint enrollment process. In some examples, the control system 106 (not shown) may control the display 210a to present the GUI 405 after receiving user input via the area 315b of the GUI 305. According to this example, the GUI area 410a provides a visual prompt for the user to place a digit in a fingerprint sensor area corresponding to the sensor 202a, which may be the primary sensor for a unified enrollment process. In this example, the GUI area 410c identifies the fingerprint sensor area corresponding to the sensor 202a. According to this example, the GUI area 410b provides a visual indication of the progress of the enrollment process for a digit 417 that is currently placed on the apparatus 101 in the fingerprint sensor area. In some alternative examples, the GUI area 410a may provide a visual prompt for the user to place a particular digit in the fingerprint sensor area, such as the user's right index finger, the user's left thumb, etc. In some examples, the GUI 405—or a similar GUI—may provide user with prompts for a multi-digit fingerprint enrollment process in which multiple digits are enrolled sequentially, simultaneously, or combinations thereof.

Figure 5A:
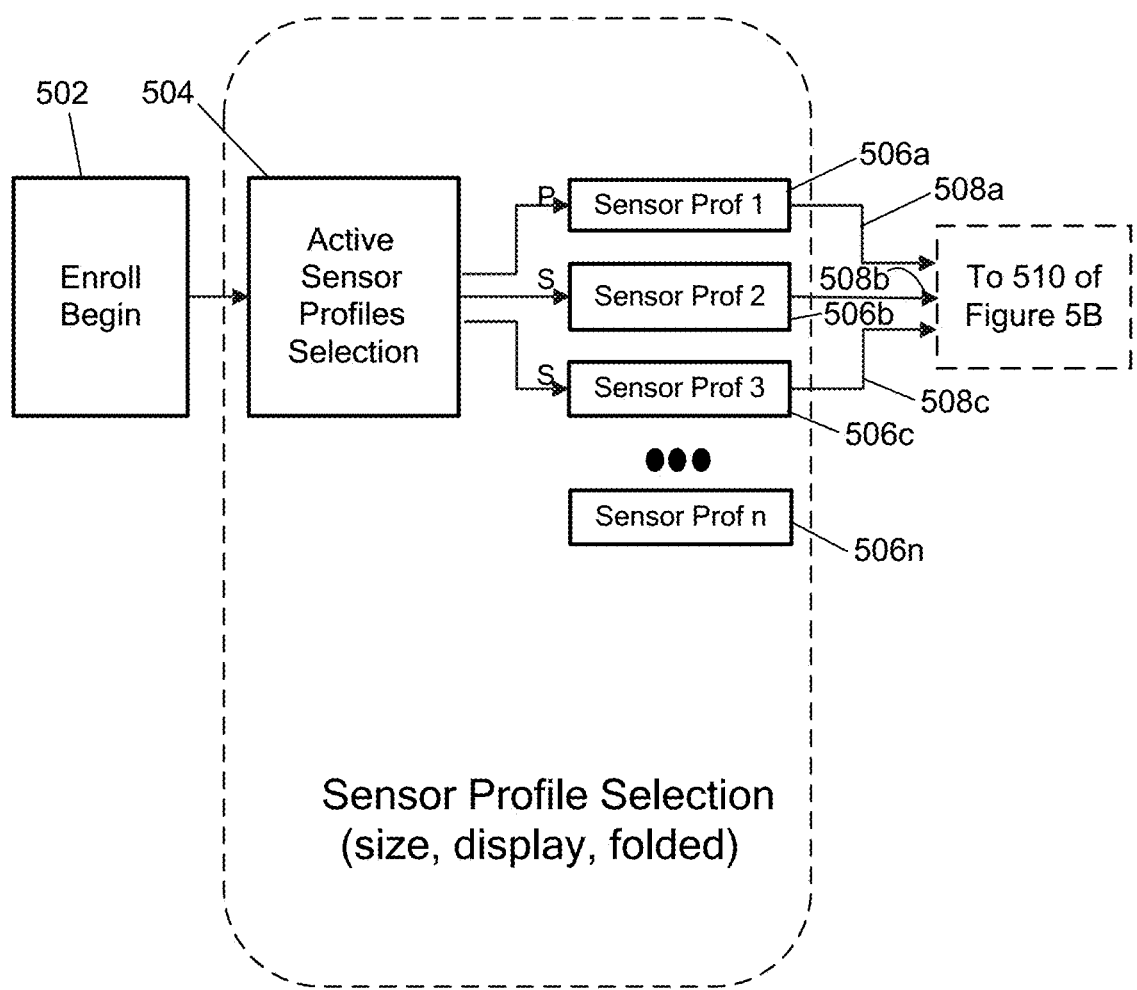
FIGS. 5A and 5B show blocks corresponding to a unified enrollment process according to some examples.
Figure 5B:
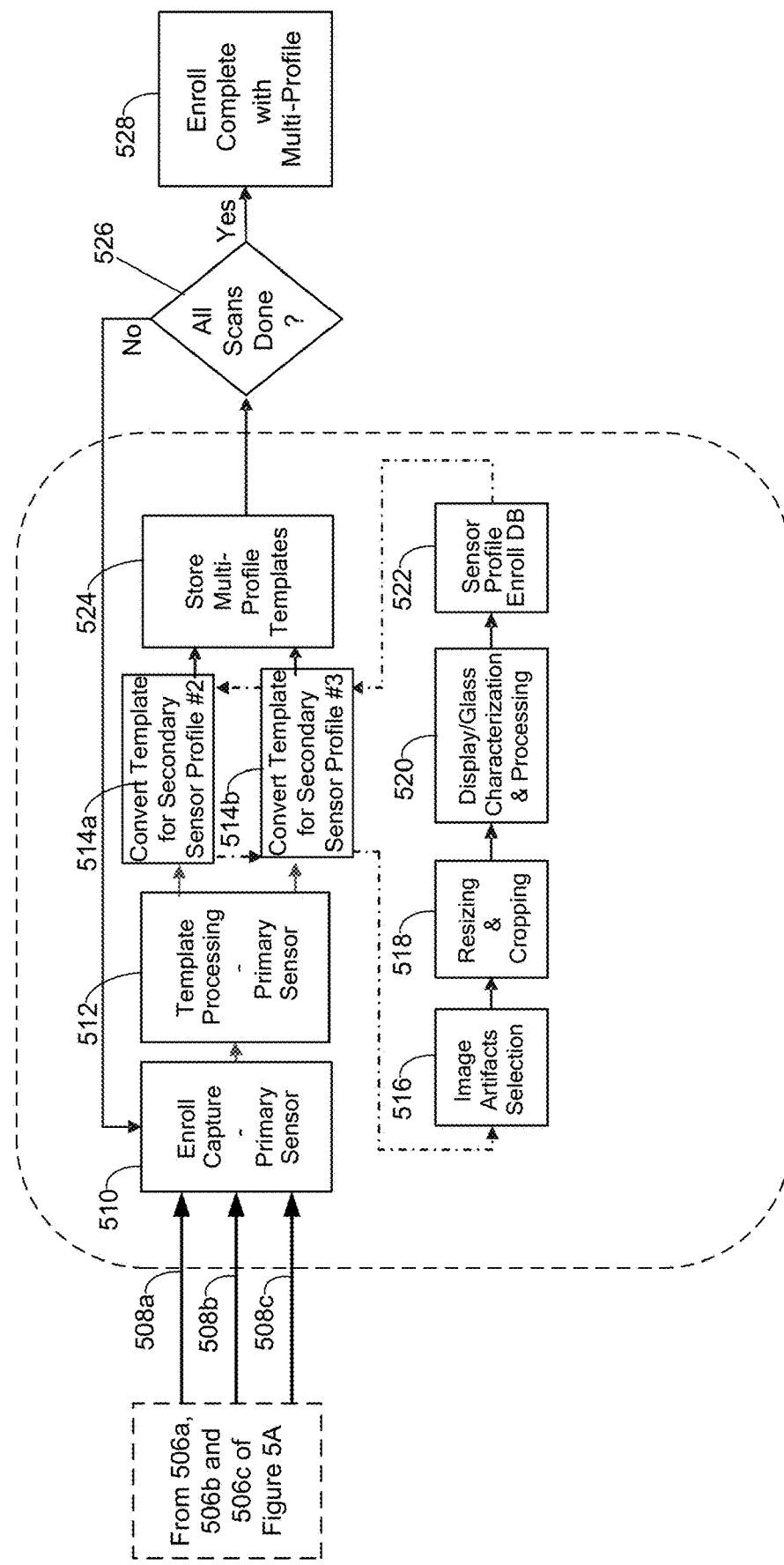

FIGS. 5A and 5B show blocks corresponding to a unified enrollment process according to some examples. The blocks of FIGS. 5A and 5B may be performed by an apparatus that includes a fingerprint sensor system having two or more fingerprint sensors, a control system and a user interface system. The blocks of FIGS. 5A and 5B may, for example, be performed by the apparatus 101 of FIG. 1 or by a similar apparatus. For example, in some implementations the control system 106 of FIG. 1 may be configured to perform, at least in part, the operations that are described herein with reference to FIGS. 5A and 5B. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIGS. 5A and 5B may include more or fewer blocks than indicated. Moreover, the disclosed operations are not necessarily performed in the order indicated. In some implementations, the operations corresponding to one or more blocks may be performed concurrently.

FIG. 5A shows blocks involved in a first phase of a unified enrollment process according to one example. In this example, the process starts with block 502, in which the unified enrollment process is initiated. Block 502, block 504, or both may, for example, involve—or be responsive to—sensor selection and/or enrollment selection processes like those described with reference to FIG. 3. According to this example, block 504 involves selecting active sensor profiles for one primary sensor and two secondary sensors. The active sensor profiles may be, or may include, what are referred to elsewhere herein as "fingerprint sensor characteristics." Accordingly, the active sensor profiles may include information regarding the fingerprint sensor type, fingerprint sensor size (for example, the fingerprint sensor area), etc. In some examples, the active sensor profiles also may include information regarding when a particular sensor may be available for use. For example, a primary sensor such as the sensor 202a of FIG. 2A may be available for use when a foldable device is in an open configuration. This information may be part of the active sensor profile for the sensor 202a or for another such primary sensor that is similarly located.

In this example, block 504 involves selecting an active sensor profile 506a for a primary sensor (P) and active sensor profiles 506b and 506c for two secondary sensors(S). As suggested by the active sensor profiles 506n, in some examples n secondary sensors may be selected, where n is an integer greater than two. According to this example, active sensor profile data 508a, 508b and 508c, corresponding to the active sensor profiles 506a, 506b and 506c, respectively, are provided to block 510 of FIG. 5B.

FIG. 5B shows blocks involved in a second phase of a unified enrollment process according to one example. In this example, the process starts with block 510, in which an enrollment process involving a primary sensor is performed. Block 510 may, for example, involve an enrollment process for a digit that involves the sensor 202a of FIG. 2A, such as those described with reference to FIG. 4. Accordingly, the control system 106 may obtain fingerprint image data from the digit via the fingerprint sensor 202a, or via another primary fingerprint sensor, in block 510.

According to this example, block 512 involves developing a primary fingerprint sensor template based on the fingerprint image data obtained during block 510. In this example, the primary fingerprint sensor template is also based the active sensor profile 506a, which corresponds to the primary sensor. In some examples, the control system 106 may be configured to create the primary fingerprint sensor template, based on the fingerprint image data obtained via the fingerprint sensor 202a, for subsequent fingerprint authentication via the fingerprint sensor 202a. The primary fingerprint sensor template may, for example, include fingerprint minutiae data corresponding to fingerprint minutiae extracted from the fingerprint image data. The primary fingerprint sensor template also may include fingerprint minutiae location data corresponding to locations of the fingerprint minutiae.

In this example, block 514a involves creating a second fingerprint sensor template for subsequent fingerprint authentication via a second fingerprint sensor based, at least in part, on the first fingerprint sensor template and the active sensor profile data 508b, which corresponds to the active sensor profile 506b for one of the secondary sensors. According to this example, block 514b involves creating a third fingerprint sensor template for subsequent fingerprint authentication via a third fingerprint sensor based, at least in part, on the first fingerprint sensor template and the active sensor profile data 508c, which corresponds to the active sensor profile 506c for the other secondary sensor selected in block 504 of FIG. 5A.

According to this example, blocks 514a and 514b each involve the processes of blocks 516, 518, 520 and 522. In other examples, blocks 514a and 514b each may involve more, fewer or different processes. In this example, block 516 involves image artifact selection and block 518 involves resizing and cropping. Blocks 516 and 518 may, in some examples, correspond to processes that are described herein with reference to FIG. 2D. Block 516 may, for example, involve determining areas of the first fingerprint sensor template that include at least a threshold number of fingerprint minutiae, or a threshold number of fingerprint minutiae per unit area. In some such examples, no second or third fingerprint sensor template may be created corresponding to areas of the first fingerprint sensor template that include less than a threshold number of fingerprint minutiae, or a threshold number of fingerprint minutiae per unit area. However, in other examples a second or third fingerprint sensor template may be created corresponding to all areas of the first fingerprint sensor template. In such examples, block 516 may be omitted.

Block 516 or 518 may, in some examples, involve determining subsets of the second sensor template corresponding to portions of the primary fingerprint sensor template. In some such examples, each subset of the second sensor template may correspond to a fingerprint sensor area indicated by the active sensor profile data 508b. Block 516 or 518 may, in some examples, involve determining subsets of the third sensor template for portions of the primary fingerprint sensor template corresponding to a fingerprint sensor area indicated by the active sensor profile data 508c. In other examples, block 516 or 518 may involve determining subsets of the second or third sensor template for portions of the primary fingerprint sensor template corresponding to a fingerprint sensor area that is less than the entire area of the fingerprint sensor indicated by the active sensor profile data 508b or 508c.

In this example, block 520 involves determining properties of one or more layers residing between the secondary fingerprint sensors and an outer surface of the apparatus. For example, if a secondary fingerprint sensor resides under an outer display visible from an outside surface of a foldable apparatus, there may be a relatively thicker protective layer, or relatively thicker protective layers, on the display 210 than on an inner display that is only visible when the foldable apparatus is open. The relatively thicker protective layer(s) on the outer display also may be exposed to relatively more damage than those on the inner display 210a. Both of these factors may degrade the ability of the fingerprint sensor to detect relatively smaller fingerprint minutiae, relatively fainter fingerprint minutiae, etc. Accordingly, block 520 may involve one or more of the compensatory methods that are described herein with reference to FIG. 2D, such as fingerprint minutiae detectability ranking, fingerprint minutiae weighting, etc. In this example, block 522 involves storing the results of blocks 516, 518 and 520 for each of the secondary sensors.

Here, block 524 involves storing the multi-profile templates for both of the secondary sensors, for the particular digit for which templates have been made in this iteration of blocks 510-522. In some examples, the storing process(es) of block 522 may be sufficient and block 524 may be omitted.

According to this example, block 526 involves determining whether templates have been made for all digits involved in the enrollment process. If it is determined in block 526 that templates need to be made for one or more additional digits, or combinations of digits, the process reverts to block 510 and fingerprint image data is obtained for another digit. The user may, for example, be prompted to place another digit in the primary fingerprint sensor area, such as described herein with reference to FIG. 4. However, if it is determined in block 526 that all digits, or combinations of digits, involved in the enrollment process have been processed, the process continues to block 528. In some examples, block 528 may involve providing an audio and/or visual message indicating that the enrollment process is complete.

Figure 6:
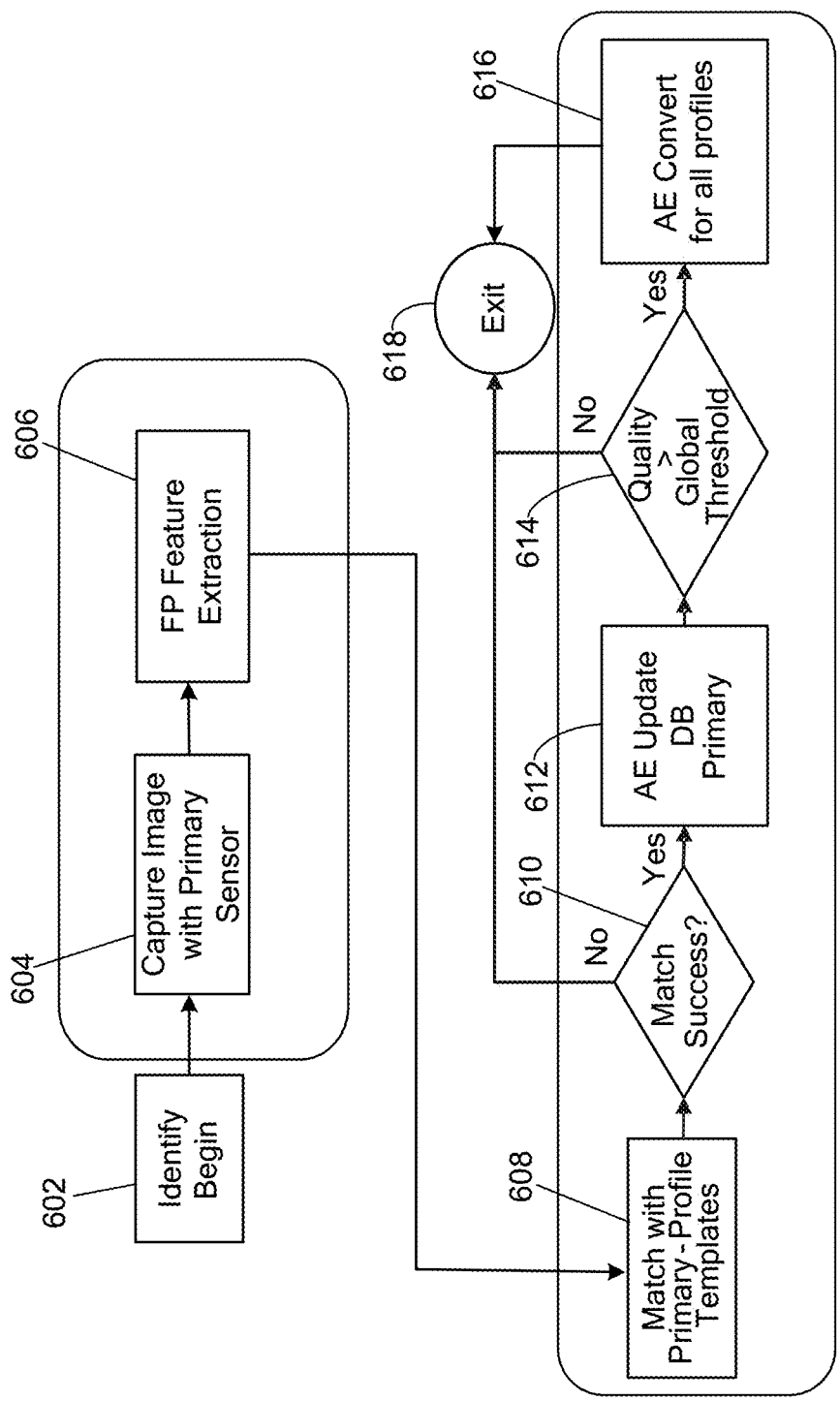
FIG. 6 show blocks corresponding to a primary sensor fingerprint authentication process according to some examples.

FIG. 6 show blocks corresponding to a primary sensor fingerprint authentication process according to some examples. The blocks of FIG. 6 may be performed by an apparatus that includes a fingerprint sensor system having two or more fingerprint sensors, a control system and a user interface system. The blocks of FIG. 6 may, for example, be performed by the apparatus 101 of FIG. 1 or by a similar apparatus. For example, in some implementations the control system 106 of FIG. 1 may be configured to perform, at least in part, the operations that are described herein with reference to FIG. 6. In some examples, the apparatus may be a mobile device, such as a cellular telephone. However, in other examples, the apparatus may be another type of device, such as a tablet, a laptop, an automobile or component thereof, a door access control device, a wearable device, etc. As with other disclosed examples, the operations described with reference to FIG. 6 may include more or fewer blocks than indicated. Moreover, the operations described herein are not necessarily performed in the order indicated. In some implementations, the operations corresponding to one or more blocks may be performed concurrently.

In this example, the process starts with block 602, in which the primary sensor fingerprint authentication process is initiated. Block 602 may, for example, involve detecting that a foldable device has been opened, determining that a device has been powered up, determining that a device has been awakened from a sleep mode, or combinations thereof. According to this example, block 604 involves obtaining fingerprint image data from a digit via a primary fingerprint sensor, such as the fingerprint sensor 202a of FIG. 2A. Block 604 may involve image data acquisition that is specific to the characteristics of the primary fingerprint sensor, the characteristics of one or more nearby device layers, etc., such as the selection of a range gate delay according to the material residing between the primary fingerprint sensor and an outer surface of the apparatus 101.

According to this example, block 606 involves extracting fingerprint features, such as fingerprint minutiae, from the fingerprint image data obtained in block 604. In some examples, block 606 may involve one or more types of data processing that is specific to the characteristics of the primary fingerprint sensor. For example, block 606 may involve one or more types of fingerprint image data processing that are based on the characteristics of the primary fingerprint sensor, characteristics of one or more materials overlying that primary fingerprint sensor, etc.

In this example, block 608 involves a process of attempting a match between the fingerprint features obtained in block 606 and previously-obtained fingerprint features. According to this example, block 608 involves attempting a match between the fingerprint features obtained in block 606 and the fingerprint features in the primary fingerprint sensor template.

Block 610 involves determining whether the attempted match of block 608 is a success. In this example, if the attempted match of block 608 is not a success, the process proceeds to exit block 618. In some examples, the user may be prompted to try another fingerprint authentication process with the same digit, to try a fingerprint authentication process with another digit, to try a different type of authentication process, etc. However, if the attempted match of block 608 is a success, the user is granted device access. In some examples, the primary fingerprint sensor template may be updated with currently-obtained fingerprint features, such as fingerprint minutiae, in block 612. According to this example, block 614 involves determining whether the quality of the fingerprint features obtained via blocks 604 and 606 exceeds a quality threshold, which is a global threshold for the entire device in this example. In this example, if it is determined in block 614 that the quality of the fingerprint features obtained via blocks 604 and 606 exceeds the quality threshold, one or more secondary fingerprint sensor templates may be updated in block 616.

Figure 7:
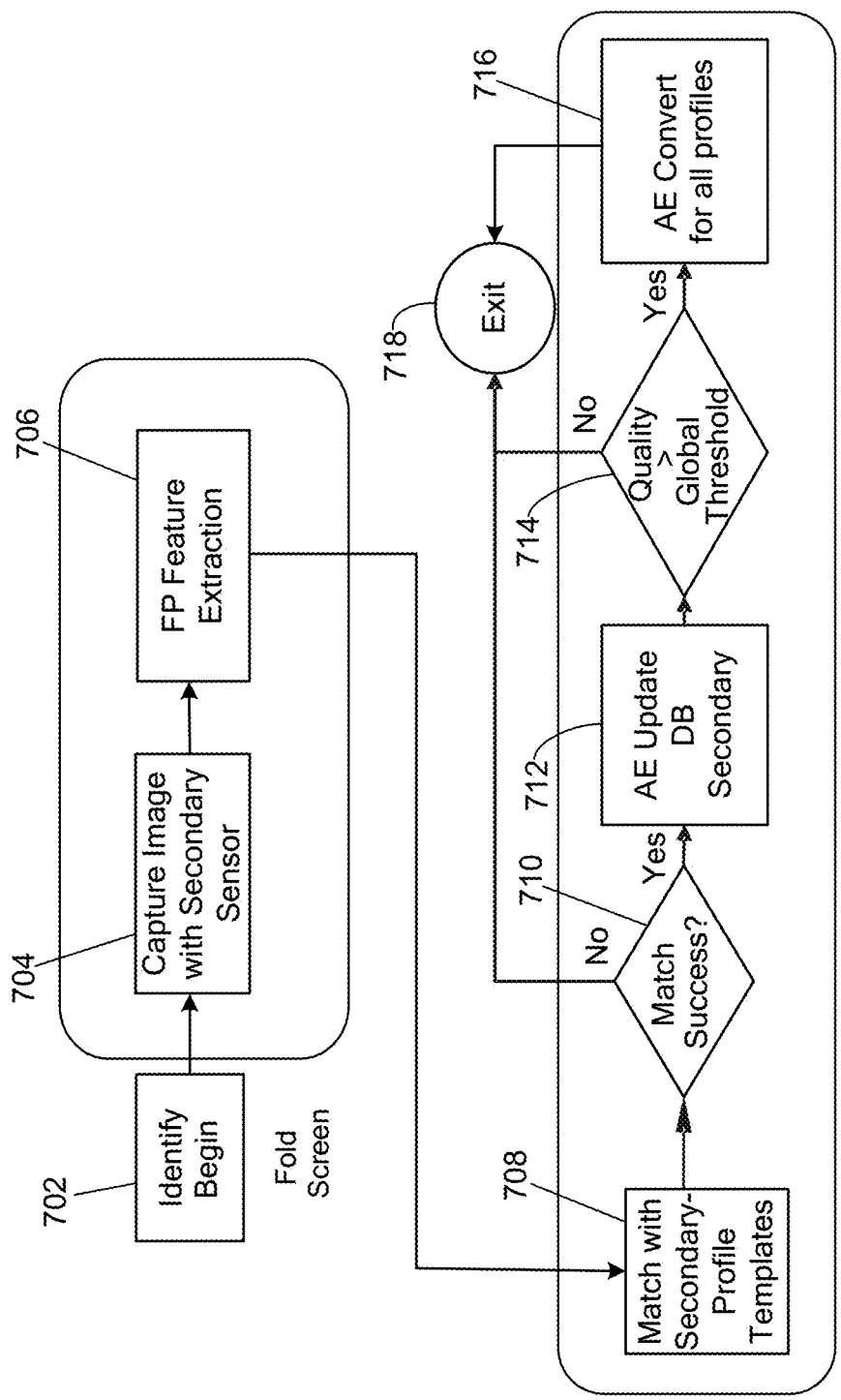
FIG. 7 show blocks corresponding to a secondary sensor fingerprint authentication process according to some examples.

FIG. 7 show blocks corresponding to a secondary sensor fingerprint authentication process according to some examples. The blocks of FIG. 7 may be performed by an apparatus that includes a fingerprint sensor system having two or more fingerprint sensors, a control system and a user interface system. The blocks of FIG. 7 may, for example, be performed by the apparatus 101 of FIG. 1 or by a similar apparatus. For example, in some implementations the control system 106 of FIG. 1 may be configured to perform, at least in part, the operations that are described herein with reference to FIG. 7. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 7 may include more or fewer blocks than indicated. Moreover, the blocks of methods disclosed herein are not necessarily performed in the order indicated. In some implementations, one or more blocks may be performed concurrently.

In this example, the process starts with block 702, in which the secondary sensor fingerprint authentication process is initiated. Block 702 may, in some examples, involve detecting that a foldable device has been closed, determining that a device has re-oriented such that a secondary has become accessible for an authentication process, etc. According to this example, block 704 involves obtaining fingerprint image data from a digit via a secondary fingerprint sensor, such as the fingerprint sensor 202b of FIG. 2B. Block 704 may involve image data acquisition that is specific to the characteristics of the secondary fingerprint sensor, the characteristics of one or more nearby device layers, etc., such as the selection of a range gate delay according to the material residing between the secondary fingerprint sensor and an outer surface of the apparatus 101.

According to this example, block 706 involves extracting fingerprint features, such as fingerprint minutiae, from the fingerprint image data obtained in block 704. In some examples, block 706 may involve one or more types of data processing that is specific to the characteristics of the secondary fingerprint sensor. For example, block 706 may involve one or more types of fingerprint image data processing that are based on the characteristics of the secondary fingerprint sensor, characteristics of one or more materials overlying the secondary fingerprint sensor, etc.

In this example, block 708 involves a process of attempting a match between the fingerprint features obtained in block 706 and previously-obtained fingerprint features. According to this example, block 708 involves attempting a match between the fingerprint features obtained in block 706 and the fingerprint features in a secondary fingerprint sensor template that has previously been created from the primary fingerprint sensor template according to a unified enrollment process.

Block 710 involves determining whether the attempted match of block 708 is a success. In this example, if the attempted match of block 708 is not a success, the process proceeds to exit block 718. In some examples, the user may be prompted to try another fingerprint authentication process with the same digit, to try a fingerprint authentication process with another digit, to try a different type of authentication process, etc. However, if the attempted match of block 708 is a success, the user is granted device access. In some examples, the secondary fingerprint sensor template may be updated in block 712. According to this example, block 714 involves determining whether the quality of the fingerprint features obtained via blocks 704 and 706 exceeds a quality threshold, which is a global threshold for the entire device in this example. In this example, if it is determined in block 714 that the quality of the fingerprint features obtained via blocks 704 and 706 exceeds the quality threshold, the primary fingerprint sensor template may be updated in block 716. In some examples, one or more other secondary fingerprint sensor templates may be updated in block 716.

Figure 8:
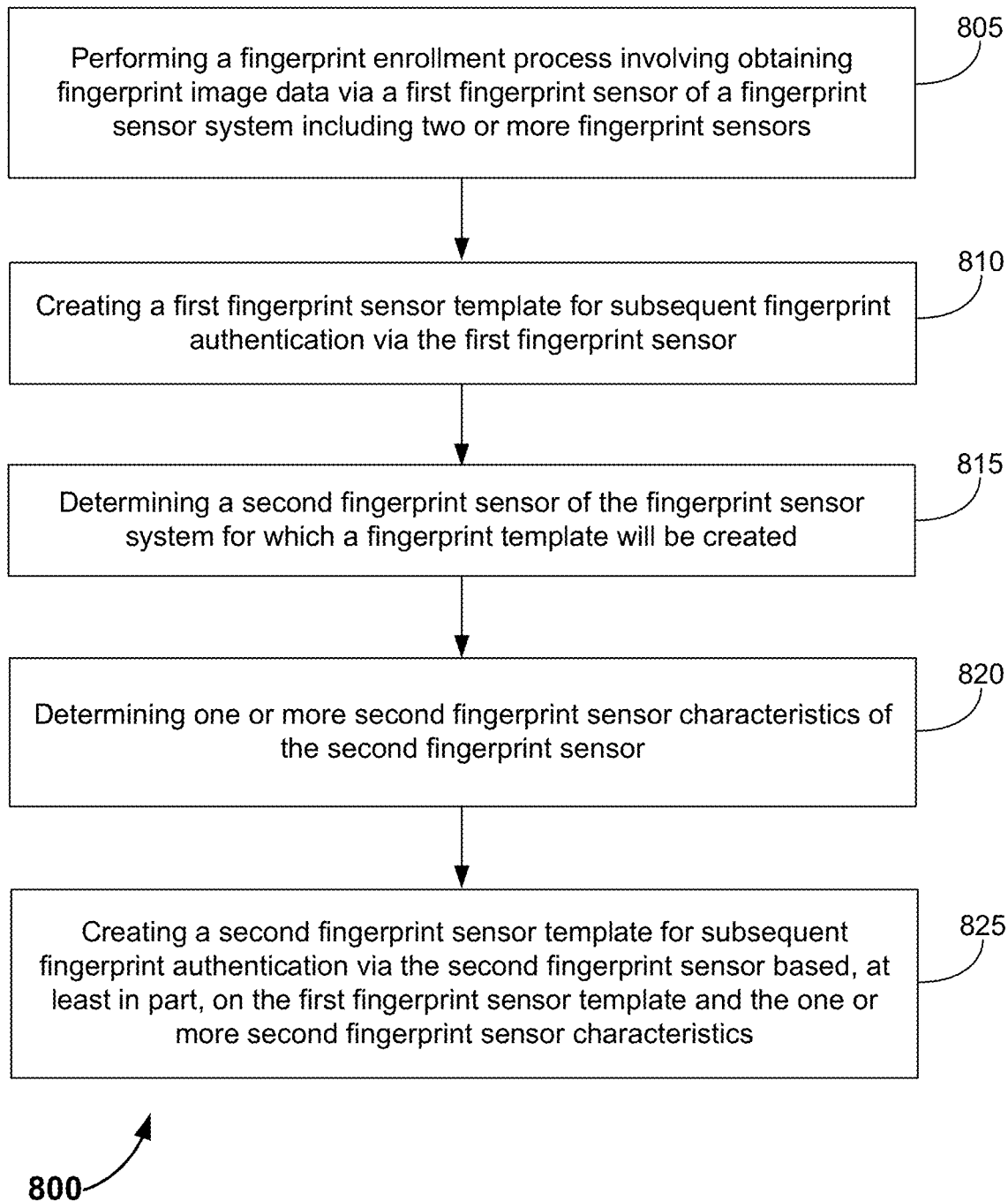
FIG. 8 is a flow diagram that presents examples of operations according to some disclosed methods.

FIG. 8 is a flow diagram that presents examples of operations according to some disclosed methods. The blocks of FIG. 8 may be performed by an apparatus that includes at least a fingerprint sensor system and a control system. The blocks of FIG. 8 may, for example, be performed by the apparatus 101 of FIG. 1 or by a similar apparatus. For example, in some implementations the control system 106 of FIG. 1 may be configured to perform, at least in part, the operations that are described herein with reference to FIG. 8. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 8 may include more or fewer blocks than indicated. Moreover, the blocks of methods disclosed herein are not necessarily performed in the order indicated. In some implementations, one or more blocks may be performed concurrently.

In this example, block 805 involves performing a fingerprint enrollment process that involves obtaining fingerprint image data via a first fingerprint sensor of a fingerprint sensor system including two or more fingerprint sensors. According to this example, the first fingerprint sensor is a primary fingerprint sensor, such as the fingerprint sensor 202a of FIG. 2A.

According to this example, block 810 involves creating a first fingerprint sensor template for subsequent fingerprint authentication via the first fingerprint sensor. Block 810 may involve any of the disclosed methods for creating a primary fingerprint sensor template, or similar methods.

In this example, block 815 involves determining a second fingerprint sensor of the fingerprint sensor system for which a fingerprint template will be created. In some examples, block 815 may involve one or more processes that are described with reference to FIG. 5A, such as the active sensor selection and active sensor profile selection processes.

According to this example, block 820 involves determining one or more second fingerprint sensor characteristics of the second fingerprint sensor. In some examples, block 820 may involve determining active sensor profile data, such as the active sensor profile data 508b or 508c, corresponding to the active sensor profiles 506b or 506c of FIG. 5A. According to some examples, the one or more second fingerprint sensor characteristics may include the size of the second fingerprint sensor, the orientation of the first fingerprint sensor, the orientation of the second fingerprint sensor, the type of the second fingerprint sensor, the resolution of the second fingerprint sensor, information regarding material residing between the second fingerprint sensor and an outer surface of an apparatus that includes the fingerprint sensor system, or combinations thereof.

In this example, block 825 involves creating a second fingerprint sensor template for subsequent fingerprint authentication via the second fingerprint sensor based, at least in part, on the first fingerprint sensor template and the one or more second fingerprint sensor characteristics. In some examples, block 825 may involve fingerprint image artifact selection, resizing, cropping, or combinations thereof. In some examples, block 825—or another block of method 800—may involve creating the second fingerprint sensor template without performing an enrollment process involving the second fingerprint sensor.

In some examples, method 800 may involve receiving user input, via a user interface system, indicating that the fingerprint enrollment process will involve obtaining fingerprint image data via the first fingerprint sensor. According to some examples, the user interface system may include a display and a touch sensor system proximate the display. In some such examples, method 800 may involve controlling the display to present a GUI indicating fingerprint enrollment options and receiving the user input via touch sensor signals from the touch sensor system corresponding to a selected fingerprint enrollment option.

According to some examples, the first fingerprint sensor may be configured for obtaining a higher quality of fingerprint image data than the second fingerprint sensor is configured for obtaining. In some examples, the first fingerprint sensor may be larger than the second fingerprint sensor.

In some examples, method 800 may involve determining a third fingerprint sensor of the fingerprint sensor system for which a fingerprint template will be created, determining one or more third fingerprint sensor characteristics of the third fingerprint sensor and creating a third fingerprint sensor template for subsequent fingerprint authentication via the third fingerprint sensor based, at least in part, on the first fingerprint sensor template and the one or more third fingerprint sensor characteristics. In some such examples, method 800 may involve creating the third fingerprint sensor template without performing an enrollment process involving the third fingerprint sensor.

Implementation examples are described in the following numbered clauses:

1. An apparatus, including: a fingerprint sensor system including two or more fingerprint sensors; and a control system configured to: perform a fingerprint enrollment process involving obtaining fingerprint image data via a first fingerprint sensor of the fingerprint sensor system; create a first fingerprint sensor template for subsequent fingerprint authentication via the first fingerprint sensor; determine a second fingerprint sensor of the fingerprint sensor system for which a fingerprint template will be created; determine one or more second fingerprint sensor characteristics of the second fingerprint sensor; and create a second fingerprint sensor template for subsequent fingerprint authentication via the second fingerprint sensor based, at least in part, on the first fingerprint sensor template and the one or more second fingerprint sensor characteristics.

2. The apparatus of clause 1, where the control system is configured to create the second fingerprint sensor template without performing an enrollment process involving the second fingerprint sensor.

3. The apparatus of clause 1 or clause 2, where the one or more second fingerprint sensor characteristics include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of the apparatus, or combinations thereof.

4. The apparatus of clause 3, where the second fingerprint sensor template is based, at least in part, on a size of the second fingerprint sensor.

5. The apparatus of clause 4, where creating the second fingerprint sensor template involves one or more of fingerprint image artifact selection, resizing or cropping.

6. The apparatus of any one of clauses 1-5, further including a user interface system, where the control system is further configured to receive user input, via the user interface system, indicating that the fingerprint enrollment process will involve obtaining fingerprint image data via the first fingerprint sensor.

7. The apparatus of clause 6, where: the user interface system includes a display and a touch sensor system proximate the display; the control system is configured to control the display to present a graphical user interface (GUI) indicating fingerprint enrollment options; and the control system receives the user input via touch sensor signals from the touch sensor system corresponding to a selected fingerprint enrollment option.

8. The apparatus of any one of clauses 1-7, where the first fingerprint sensor is configured for obtaining a higher quality of fingerprint image data than the second fingerprint sensor is configured for obtaining.

9. The apparatus of any one of clauses 1-8, where the first fingerprint sensor is larger than the second fingerprint sensor.

10. The apparatus of any one of clauses 1-9, where: the apparatus includes a foldable display; and at least a portion of the foldable display resides between the first fingerprint sensor and an outer surface of the apparatus.

11. The apparatus of clause 10, where the second fingerprint sensor is configured for fingerprint authentication when the foldable display is closed.

12. The apparatus of clause 10, where the first fingerprint sensor is not configured for fingerprint authentication when the foldable display is closed.

13. The apparatus of any one of clauses 1-12, where the control system is further configured to: determine a third fingerprint sensor of the fingerprint sensor system for which a fingerprint template will be created; determine one or more third fingerprint sensor characteristics of the third fingerprint sensor; and create a third fingerprint sensor template for subsequent fingerprint authentication via the third fingerprint sensor based, at least in part, on the first fingerprint sensor template and the one or more third fingerprint sensor characteristics.

14. The apparatus of clause 13, where the control system is configured to create the third fingerprint sensor template without performing an enrollment process involving the third fingerprint sensor.

15. An apparatus, including: a fingerprint sensor system including two or more fingerprint sensors; and control system means for: performing a fingerprint enrollment process involving obtaining fingerprint image data via a first fingerprint sensor of the fingerprint sensor system; creating a first fingerprint sensor template for subsequent fingerprint authentication via the first fingerprint sensor; determining a second fingerprint sensor of the fingerprint sensor system for which a fingerprint template will be created; determining one or more second fingerprint sensor characteristics of the second fingerprint sensor; and creating a second fingerprint sensor template for subsequent fingerprint authentication via the second fingerprint sensor based, at least in part, on the first fingerprint sensor template and the one or more second fingerprint sensor characteristics.

16. The apparatus of clause 15, where the control means includes means for creating the second fingerprint sensor template without performing an enrollment process involving the second fingerprint sensor.

17. A method, including: performing a fingerprint enrollment process involving obtaining fingerprint image data via a first fingerprint sensor of a fingerprint sensor system including two or more fingerprint sensors; creating a first fingerprint sensor template for subsequent fingerprint authentication via the first fingerprint sensor; determining a second fingerprint sensor of the fingerprint sensor system for which a fingerprint template will be created; determining one or more second fingerprint sensor characteristics of the second fingerprint sensor; and creating a second fingerprint sensor template for subsequent fingerprint authentication via the second fingerprint sensor based, at least in part, on the first fingerprint sensor template and the one or more second fingerprint sensor characteristics.

18. The method of clause 17, where the method involves creating the second fingerprint sensor template without performing an enrollment process involving the second fingerprint sensor.

19. The method of clause 17 or clause 18, where the one or more second fingerprint sensor characteristics include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of an apparatus that includes the fingerprint sensor system, or combinations thereof.

20. The method of clause 19, where the second fingerprint sensor template is based, at least in part, on a size of the second fingerprint sensor.

21. The method of clause 20, where creating the second fingerprint sensor template involves one or more of fingerprint image artifact selection, resizing or cropping.

22. The method of any one of clauses 17-21, further including receiving user input, via a user interface system, indicating that the fingerprint enrollment process will involve obtaining fingerprint image data via the first fingerprint sensor.

23. The method of clause 22, where the user interface system includes a display and a touch sensor system proximate the display and where the method involves: controlling the display to present a graphical user interface (GUI) indicating fingerprint enrollment options; and receiving the user input via touch sensor signals from the touch sensor system corresponding to a selected fingerprint enrollment option.

24. The method of any one of clauses 17-23, where the first fingerprint sensor is configured for obtaining a higher quality of fingerprint image data than the second fingerprint sensor is configured for obtaining.

25. The method of any one of clauses 17-24, where the first fingerprint sensor is larger than the second fingerprint sensor.

26. The method of any one of clauses 17-25, further including: determining a third fingerprint sensor of the fingerprint sensor system for which a fingerprint template will be created; determining one or more third fingerprint sensor characteristics of the third fingerprint sensor; and creating a third fingerprint sensor template for subsequent fingerprint authentication via the third fingerprint sensor based, at least in part, on the first fingerprint sensor template and the one or more third fingerprint sensor characteristics.

27. The method of clause 26, where the method involves creating the third fingerprint sensor template without performing an enrollment process involving the third fingerprint sensor.

28. One or more non-transitory computer-readable media having instructions for controlling one or more devices to perform a method stored thereon, the method including: performing a fingerprint enrollment process involving obtaining fingerprint image data via a first fingerprint sensor of a fingerprint sensor system including two or more fingerprint sensors; creating a first fingerprint sensor template for subsequent fingerprint authentication via the first fingerprint sensor; determining a second fingerprint sensor of the fingerprint sensor system for which a fingerprint template will be created; determining one or more second fingerprint sensor characteristics of the second fingerprint sensor; and creating a second fingerprint sensor template for subsequent fingerprint authentication via the second fingerprint sensor based, at least in part, on the first fingerprint sensor template and the one or more second fingerprint sensor characteristics.

29. The one or more non-transitory computer-readable media of clause 28, where the method involves creating the second fingerprint sensor template without performing an enrollment process involving the second fingerprint sensor.

30. The one or more non-transitory computer-readable media of clause 28 or clause 29, where the one or more second fingerprint sensor characteristics include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of the method, or combinations thereof.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A method, comprising:
    performing a fingerprint enrollment process involving obtaining fingerprint image data via a first fingerprint sensor of a fingerprint sensor system including two or more fingerprint sensors;
    creating a first fingerprint sensor template for subsequent fingerprint authentication via the first fingerprint sensor;
    determining a second fingerprint sensor of the fingerprint sensor system for which a fingerprint template will be created;
    determining one or more second fingerprint sensor characteristics of the second fingerprint sensor; and
    creating a second fingerprint sensor template for subsequent fingerprint authentication via the second fingerprint sensor based, at least in part, on the first fingerprint sensor template and the one or more second fingerprint sensor characteristics, wherein the second fingerprint sensor template includes fingerprint minutiae.

2. The method of claim 1, wherein the method involves creating the second fingerprint sensor template without performing an enrollment process involving the second fingerprint sensor.

3. The method of claim 1, wherein the one or more second fingerprint sensor characteristics include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of an apparatus that includes the fingerprint sensor system, or combinations thereof.

4. The method of claim 3, wherein the second fingerprint sensor template is based, at least in part, on a size of the second fingerprint sensor.

5. The method of claim 4, wherein creating the second fingerprint sensor template involves one or more of fingerprint image artifact selection, resizing or cropping.

6. The method of claim 1, further comprising receiving user input, via a user interface system, indicating that the fingerprint enrollment process will involve obtaining fingerprint image data via the first fingerprint sensor.

7. The method of claim 6, wherein the user interface system includes a display and a touch sensor system proximate the display and wherein the method involves:
controlling the display to present a graphical user interface (GUI) indicating fingerprint enrollment options; and
receiving the user input via touch sensor signals from the touch sensor system corresponding to a selected fingerprint enrollment option.

8. The method of claim 1, wherein the first fingerprint sensor is configured for obtaining a higher quality of fingerprint image data than the second fingerprint sensor is configured for obtaining.

9. The method of claim 1, wherein the first fingerprint sensor is larger than the second fingerprint sensor.

10. The method of claim 1, further comprising:
determining a third fingerprint sensor of the fingerprint sensor system for which a fingerprint template will be created;
determining one or more third fingerprint sensor characteristics of the third fingerprint sensor; and
creating a third fingerprint sensor template for subsequent fingerprint authentication via the third fingerprint sensor based, at least in part, on the first fingerprint sensor template and the one or more third fingerprint sensor characteristics.

11. The method of claim 10, wherein the method involves creating the third fingerprint sensor template without performing an enrollment process involving the third fingerprint sensor.

12. An apparatus, comprising:
a fingerprint sensor system including two or more fingerprint sensors; and
a control system including one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof, the control system being configured to:
perform a fingerprint enrollment process involving obtaining fingerprint image data via a first fingerprint sensor of the fingerprint sensor system;
create a first fingerprint sensor template for subsequent fingerprint authentication via the first fingerprint sensor;
determine a second fingerprint sensor of the fingerprint sensor system for which a fingerprint template will be created;
determine one or more second fingerprint sensor characteristics of the second fingerprint sensor; and
create a second fingerprint sensor template for subsequent fingerprint authentication via the second fingerprint sensor based, at least in part, on the first fingerprint sensor template and the one or more second fingerprint sensor characteristics, wherein the second fingerprint sensor template includes fingerprint minutiae.

13. The apparatus of claim 12, wherein the control system is configured to create the second fingerprint sensor template without performing an enrollment process involving the second fingerprint sensor.

14. The apparatus of claim 12, wherein the one or more second fingerprint sensor characteristics include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of the apparatus, or combinations thereof.

15. The apparatus of claim 14, wherein the second fingerprint sensor template is based, at least in part, on a size of the second fingerprint sensor.

16. The apparatus of claim 15, wherein creating the second fingerprint sensor template involves one or more of fingerprint image artifact selection, resizing or cropping.

17. The apparatus of claim 12, further comprising a user interface system, wherein the control system is further configured to receive user input, via the user interface system, indicating that the fingerprint enrollment process will involve obtaining fingerprint image data via the first fingerprint sensor.

18. The apparatus of claim 17, wherein:
the user interface system includes a display and a touch sensor system proximate the display;
the control system is configured to control the display to present a graphical user interface (GUI) indicating fingerprint enrollment options; and
the control system receives the user input via touch sensor signals from the touch sensor system corresponding to a selected fingerprint enrollment option.

19. The apparatus of claim 12, wherein the first fingerprint sensor is configured for obtaining a higher quality of fingerprint image data than the second fingerprint sensor is configured for obtaining.

20. The apparatus of claim 12, wherein the first fingerprint sensor is larger than the second fingerprint sensor.

21. The apparatus of claim 12, wherein:
the apparatus includes a foldable display; and
at least a portion of the foldable display resides between the first fingerprint sensor and an outer surface of the apparatus.

22. The apparatus of claim 21, wherein the second fingerprint sensor is configured for fingerprint authentication when the foldable display is closed.

23. The apparatus of claim 21, wherein the first fingerprint sensor is not configured for fingerprint authentication when the foldable display is closed.

24. The apparatus of claim 12, wherein the control system is further configured to:
determine a third fingerprint sensor of the fingerprint sensor system for which a fingerprint template will be created;
determine one or more third fingerprint sensor characteristics of the third fingerprint sensor; and
create a third fingerprint sensor template for subsequent fingerprint authentication via the third fingerprint sensor based, at least in part, on the first fingerprint sensor template and the one or more third fingerprint sensor characteristics.

25. The apparatus of claim 24, wherein the control system is configured to create the third fingerprint sensor template without performing an enrollment process involving the third fingerprint sensor.

26. One or more non-transitory computer-readable media having instructions for controlling one or more devices to perform a method stored thereon, the method comprising:
performing a fingerprint enrollment process involving obtaining fingerprint image data via a first fingerprint sensor of a fingerprint sensor system including two or more fingerprint sensors;

creating a first fingerprint sensor template for subsequent fingerprint authentication via the first fingerprint sensor;

determining a second fingerprint sensor of the fingerprint sensor system for which a fingerprint template will be created;

determining one or more second fingerprint sensor characteristics of the second fingerprint sensor; and creating a second fingerprint sensor template for subsequent fingerprint authentication via the second fingerprint sensor based, at least in part, on the first fingerprint sensor template and the one or more second fingerprint sensor characteristics, wherein the second fingerprint sensor template includes fingerprint minutiae.

27. The one or more non-transitory computer-readable media of claim 26, wherein the method involves creating the second fingerprint sensor template without performing an enrollment process involving the second fingerprint sensor.

28. The one or more non-transitory computer-readable media of claim 26, wherein the one or more second fingerprint sensor characteristics include a size of the second fingerprint sensor, an orientation of the first fingerprint sensor, an orientation of the second fingerprint sensor, a type of the second fingerprint sensor, a resolution of the second fingerprint sensor, information regarding material residing between the second fingerprint sensor and an outer surface of the method, or combinations thereof.

* * * * *